US006203923B1

(12) United States Patent
Bansleben et al.

(10) Patent No.: US 6,203,923 B1
(45) Date of Patent: Mar. 20, 2001

(54) REGIO-REGULAR FUNCTIONALIZED POLYMERIC PACKAGING MATERIAL

(75) Inventors: Donald Albert Bansleben, Columbia; Truc-Chi Huynh-Tran, Burtonsville, both of MD (US); Rusty Lew Blanski, Lancaster, CA (US); Paul Anthony Hughes, Columbia, MD (US); William Peyton Roberts, Spartanburg, SC (US); Robert Howard Grubbs, South Pasadena, CA (US); Galen Richard Hatfield, Ellicott City, MD (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/161,663

(22) Filed: Sep. 29, 1998

(51) Int. Cl.[7] ..................................................... B32B 27/00
(52) U.S. Cl. ........................................... 428/500; 428/220
(58) Field of Search .................................. 428/500, 220; 526/348, 348.2, 348.6, 348.8

(56) References Cited

U.S. PATENT DOCUMENTS

| 4,816,521 | 3/1989 | Asrar .................................. 525/327.2 |
|---|---|---|
| 4,891,414 | 1/1990 | Asrar ...................................... 526/269 |
| 4,940,758 | 7/1990 | Wong ...................................... 525/539 |
| 5,169,928 | * 12/1992 | van Doorn et al. ................... 528/392 |
| 5,352,767 | 10/1994 | Chein .................................... 528/392 |
| 5,763,101 | 6/1998 | Yoshimi et al. ...................... 428/524 |

FOREIGN PATENT DOCUMENTS

| 0626402 | 11/1994 | (EP) . |
|---|---|---|
| 0735081 | 10/1996 | (EP) . |
| 0791615 | 8/1997 | (EP) . |
| 0796607 | 9/1997 | (EP) . |
| 0244158 | 9/1996 | (JP) . |
| 0244180 | 9/1996 | (JP) . |
| 0253676 | 10/1996 | (JP) . |
| 0259801 | 10/1996 | (JP) . |
| 0259802 | 10/1996 | (JP) . |
| 0235370 | 9/1997 | (JP) . |
| 0081745 | 3/1998 | (JP) . |
| 0204121 | 8/1998 | (JP) . |
| 9320111 | 10/1994 | (WO) . |
| 9720865 | 6/1997 | (WO) . |
| 9837110 | * 2/1998 | (WO) . |

OTHER PUBLICATIONS

Hillmyer M A et al; "Ring–Opening Metathesis Polymerization of Functionalized Cyclooctenes by a Ruthenium–Based Metathesis Catalyst" Macromolecules, vol. 28, No. 18, Aug. 28, 1995, pp. 6311–6316.
Maughon B R et al; "Synthesis and Controlled Cross–Linking of Polymers Derived from Ring–Opening Metathesis Polymerizatoin (ROMP)" Macromolecules, vol. 29, No. 18, Aug. 26, 1996, pp. 5765–5769.
J. of Polymer Science, Part A, vol. 36, pp. 889–900 (1998).
Valenti and Wagener, *Macromolecules*, 31,2764–2773 (1998).
Hillimer et al., *Macromolecules*, 28, 6311–6316 (1995).
Ramakrishnan et al., *Macromolecules*, 24, 3753–3759 (1991).
Ramakrishnan et al., *Macromolecules*, 23, 4519–4524 (1990).
Perrott et al., *Macromolecules*, 28, 3492–3494 (1995).

* cited by examiner

*Primary Examiner*—Paul Thibodeau
*Assistant Examiner*—Monique Jackson
(74) *Attorney, Agent, or Firm*—Howard Troffkin; Daniel Ruble (57) ABSTRACT

The present invention is directed to Packaging Materials and Packaging Articles having a structure composed of a substantially linear, regio-regular functionalized hydrocarbon polymer having $C_4$–$C_{12}$ hydrocarbon polymer repeating units wherein each unit has at least one functional group uniformly pendent therefrom.

34 Claims, 3 Drawing Sheets

REGIO-REGULAR FUNCTIONALIZED POLYMERIC PACKAGING MATERIAL

This invention was made with United States Government support under Contract No. 70NANB5H1136 awarded by the Department of Commerce's National Institute of Standards and Technology. The United States has certain rights in the invention.

BACKGROUND OF THE INVENTION

The present invention is directed to films, coatings and articles useful in packaging applications, especially in the packaging of oxygen-sensitive materials, such as foodstuff and medicaments.

Packaging articles, whether in the form of a film (single or multi-layer), or structural design which may be flexible, semi-rigid, rigid and which may be of a lidded or collapsible design ("Packaging Article"), serve not merely to contain the substance being packaged but, depending on the nature of the substance, to also prevent ingress of harmful matter from the environment or, alternately, of egress of volatiles within a Packaging Article.

Oxygen from the atmosphere has long been recognized as one of the most harmful matter for many packaged materials, especially foodstuffs. Thus, the teaching herein shall be mainly directed but not limited to Packaging Articles which have high oxygen barrier properties due to having, as part of the Article's structure, a hydroxy-functionalized, regio-regular hydrocarbon polymer. Packaging Articles which comprise subject regio-regular polymer having certain other functional groups, as described herein, provide Articles with other desired properties, as fully disclosed herein below.

In packaging oxygen sensitive substances, such as foodstuffs, beverages, and pharmaceuticals (collectively "products"), oxygen contamination can be particularly troublesome. Care is generally taken to minimize the introduction or concentration of oxygen or to reduce the detrimental or undesirable effects of oxygen on the foodstuff or beverage.

Molecular oxygen ($O_2$) can be reduced to a variety of intermediate species by the addition of one to four electrons; these species are superoxide, hydroxy radical, hydrogen peroxide, and water. $O_2$ and water are relatively unreactive. However, the three intermediate species are very reactive. Also, $O_2$ can be activated to single electron state oxygen (which can undergo subsequent reduction to the more reactive oxygen species) by irradiation, or by the presence of catalytic agents. These reactive oxygen species are free radical in nature, and the oxidative reactions in which they participate are therefore autocatalytic.

Carbon-carbon double bonds are particularly susceptible to reaction with the intermediate species. Such carbon-carbon bonds are often found in foods and beverages, pharmaceuticals, dyes, photochemicals, adhesives, rubbers and polymer precursors. Virtually any product which has complex organic constituents will contain such carbon-carbon double bonds or other oxygen reactive components, and hence are susceptible to undergoing oxidative reactions. Thus, if the oxidation products adversely affect the quality performance, odor or flavor of the packaged product, then preventing oxygen ingress into a Packaging Article will greatly benefit the packaged products storage life and usefulness.

A number of strategies exist to deal with oxygen which is contained within a Packaging Article's free void space. The most basic is to remove the oxygen by vacuum or by inert gas sparging or both. More recently, oxygen scavenger compositions have been added to polymeric gasket compositions used in certain elements of Packaging Articles (e.g., bottle caps and can closures) as well as in one or more layers of polymeric films used to form Packaging Articles. Such scavenger compositions address the need to remove oxygen from the interior of a closed Packaging Article by reacting or combining with the entrapped oxygen or with oxygen which may enter the Packaging Article during transportation or storage. Although the methods and compositions described above address the concerns with entrapped oxygen, they do not primarily address the problems associated with entry of oxygen and other contaminants into a Packaging Article from the exterior environment.

Glass and metals provide packaging materials which have extremely good barrier properties with respect to the ingress of substances from the exterior environment. However, these packaging materials are costly, provide Packaging Articles which are heavy, rigid in construction and, in the case of glass, are breakable.

Polymers have also been used extensively in packaging applications where they have many advantages over the use of glass or metal. The advantages are derived from the diversity of polymers themselves in their mechanical, thermal, chemical resistance and optical properties and from the diversity and adaptability of fabrication techniques which can be employed. Thus, flexible bags, semi-rigid and rigid containers as well as clinging and shrinkable films can be made into Packaging Articles which have walls of homogeneous, laminated or coated structure.

Further, packaging materials and the articles may be formed of a single layer (one composition throughout its thickness) or as a multi-layer structure wherein different layers of the structure are present to provide a combination of desired properties. For example, one or both surface layers may be composed of polymer(s) having groups which provide sealing properties. Other layers may be formed of polymers having high tensile strength to impart tear resistance to the resultant film and article. Similarly, polymers or blends of polymers may be used in different layers of a multi-ply material to impart gas barrier properties, printability characteristics, strength, heat shrink properties, adhesion between other layers which otherwise have poor adhesion properties to each other, as well as other properties desired of the resultant Packaging Article.

It has been presently found that improved packaging materials can be formed by utilizing certain polymers which have functional groups capable of contributing a particular property and where the structure of the polymers have a substantially linear hydrocarbon backbone chain (is substantially devoid of side chains) and has a substantially uniform sequence of atoms along the polymer chains. It has been further found that improved packaging materials can be formed from certain linear polymers which have a uniform sequence of atoms along the polymer chain and have functional groups substantially uniformly pendent therefrom (regio-regular structure). It has been still further found that improved packaging materials can be formed from said regio-regular hydrocarbon polymers which have functional groups pendent from vicinal carbons along the chain (i.e., the functional groups are present in a head-to-head configuration).

Thus, it is the object of the present invention to provide packaging materials and Packaging Articles formed therefrom comprising a regio-regular, linear hydrocarbon polymer having a structure comprising pendent functional groups uniformly distributed along the polymer chain.

It is also an object of the present invention to provide packaging materials and Packaging Articles formed therefrom comprising a regio-regular, linear hydrocarbon polymer having a structure comprising vicinal pendent functional groups uniformly distributed along the polymer chain.

It is a further object of the present invention to provide packaging materials and Packaging Articles formed therefrom having a structure composed of at least one layer wherein at least one of said layer(s) of the structure comprises a functionalized, linear, regio-regular hydrocarbon polymer.

It is still further an object of the present invention to provide packaging material and Packaging Articles formed therefrom having a structure composed of at least one layer wherein at least one of said layer(s) of the structure comprises a hydroxyl functionalized, linear, regio-regular hydrocarbon polymer and, preferably wherein the hydroxyl groups are pendent from vicinal carbon atoms of the polymer chain.

It is further an object of the present invention to provide packaging material and Packaging Articles formed therefrom which are capable of exhibiting very low degrees of gas (e.g., oxygen) permeability and are capable of having said low permeability irrespective of environmental moisture content.

SUMMARY OF THE INVENTION

The present invention is directed to packaging materials and Packaging Articles which have, as part of their structure, a functionalized, linear, regio- regular hydrocarbon polymer The packaging material may be comprised of one layer or a plurality of layers provided at least one layer of the material and of the resultant article comprises the functionalized, linear, regio-regular hydrocarbon polymer, preferably wherein the polymer functional groups are pendent from vicinal carbon atoms of the hydrocarbon polymer backbone chain.

DETAILED DESCRIPTION

The packaging material and Packaging Articles of the present invention shall be described in terms of such material and articles which have a thickness which comprises a substantially uniform composition from one surface to the other surface forming the bounds of the thickness (i.e., a single ply or monolayer structure) as well as material and articles which have a thickness comprising a plurality of layers (i.e., a multi-ply or multi-layer structure). Further, the present invention shall address the layer or layers of the structure which utilize the presently described functionalized polymers which are substantially linear, have regio-regular structure with respect to the polymer's hydrocarbon backbone chain and, preferably, have functional groups in a regular head-to-head relationship to each other (the functional groups are pendent from adjacent carbon atoms of the polymer's hydrocarbon backbone chain). The remaining layer(s) forming a multi-layer material can be chosen from any known composition used in packaging applications known to one reasonably skilled in the art to provide a multi-layer packaging material and article. The subject material and structure formed therefrom may be used to form part or substantially all of the subject Packaging Article.

The present invention is directed to packaging materials and articles which utilize a substantially linear, regio-regular functionalized hydrocarbon polymer. Such polymers have regular repeating units which can be represented by the formula:

I wherein

X and Y each independently represents hydrogen, a $C_1$–$C_5$ alkyl, or a functional group selected from a hydroxyl group, carboxylic acid group, carboxylic acid ester group of a $C_1$–$C_5$ alkyl, acetate group, amide group, nitrile group or carbonyl group; provided at least one of the X and Y groups of each unit of the polymer represents one of said functional groups and, preferably both X and Y groups of each unit of the polymer represent functional groups;

each R independently represents hydrogen atom or a $C_1$–$C_5$ alkyl, preferably hydrogen;

"a" represents an integer of 1 to 9, preferably 1, 2 or 4–9 and more preferably 1, 2, 5, 7, or 9; and "n" represents an integer from 5 to 5000 and preferably from 10 to 3000.

Thus, the subject polymer is substantially linear, has a hydrocarbon polymer backbone chain, has repeating units along said chain and comprises at least one functional group (preferably two groups on vicinal carbon atoms) regio-regularly positioned along the polymer chain.

Functionalized regio-regular hydrocarbon polymers having small repeating units can be formed by acyclic diene metathesis polymerization, as described by Valenti and Wagener, in Macromolecules (1998) 31, 2764–2773; by ring opening metathesis polymerization, as described by Hillmeyer, Laredo and Grubbs, in Macromolecules (1995) 28, 6311–6316; by hydroboration of unsaturated polymers to provide mono hydroxy functional polymers, as described by Ramakrishnan in Macromolecules (1991) 24, 3753–3759 and by Ramakrishnan and Chung in Macromolecules (1990) 23, 4519–4524; and by ring opening metathesis polymerization of 3,4-capped difunctional cyclobutene to provide an unsaturated polymer, as described by Perrott and Novak in Macromolecules (1995) 28, 3492–3494 which, after removal of the protective cap group, can be converted to the saturated polymer by hydrogenation. The teachings of each of the above cited articles are directed to synthesis processes for forming such polymers and, such teachings are incorporated herein in their entirety by reference.

In addition to the above-described synthesis, certain functionalized regio-regular polymers prepared by ROMP of functionalized $C_7$–$C_{12}$ cyclic olefins have been described in copending U.S. patent application having Ser. No. 09/052,079, filed Mar. 31, 1998, pending the teachings of which are incorporated herein in its entirety by reference. The polymers of this copending application, in particular those having vicinal functional groups are preferred polymers to be used in forming the present Packaging Articles.

The packaging materials and the Packaging Articles of the present invention comprise a structure of at least one layer (one or more than one layer) wherein at least one of said layer(s) is formed of a composition comprising a functionalized, regio-regular hydrocarbon polymer or a mixture thereof. The regio-regular polymers used herein preferably have substantially all vicinal configuration of functional groups pendent from the polymer backbone chain. The subject polymers can be formed by ring-opening metathesis polymerization (ROMP) of a $C_5$ or $C_7$–$C_{12}$ cyclic olefin having at least one and, more preferably, vicinal functional groups pendent from the ring carbon atoms. The formed polymer may then be hydrogenated to provide a substantially straight chain alkylene resultant polymer having pendent functional groups (preferably configured head-to-head) periodically distributed along the polymer chain. Alternately, the polymer formed by ROMP may be partially hydrogenated to provide a resultant polymer which also has ethylenic unsaturation periodically as part of the hydrocarbon backbone structure. These polymers exhibit enhanced properties which make them useful in forming packaging materials and articles.

The polymer used in the subject packaging material and article can be formed from a functionalized $C_5$ or $C_7$–$C_{12}$ cyclohydrocarbon having one olefinic unsaturation group as part of the ring structure. The functionalized cyclohydrocarbon may, for example, be selected from cyclopentene, cycloheptene, cyclooctene, cyclononene, cyclodecene, cyclohendecene, cyclododecene and the like The preferred functionalized cyclohydrocarbons are those having five, eight, ten or twelve carbon atoms making up the ring. The resultant polymer I thus has repeating units wherein "a" is equal to 2, 5, 7, or 9, respectively. The term $C_5$ and $C_7$–$C_{12}$ refers to the number of carbon atoms forming the ring structure of the functionalized cyclic olefin.

The functionalized polymer used herein can be formed from an unsaturated cyclohydrocarbon having at least one functional group pendent from a carbon atom of the ring starting material. Preferably, the cycloalkene starting material and the resultant polymer should have vicinal functional groups pendent from carbon atoms of the ring and of the polymer's backbone chain, respectively. The teachings made in referenced copending application, U.S. Ser. No. 09/052,079, with respect to the functionalized cycloolefin starting material, the resultant polymer, and the method of forming same are also applicable with respect to starting material and polymer having only one functional group per repeating unit (region) of the regio-regular polymer. Where the functional group can be either one or more than one group in a region, the teachings of the referenced copending application can be viewed as having X of Formula II, IV and V herein below as representing hydrogen or a functional group, and is preferably a functional group, as stated in the copending referenced U.S. patent application. In either case, at least one carbon which is adjacent to the olefinic group of the ring must be free of functional groups. That is, when numbering the ethylenic carbons 1 and 2, the next carbon and, preferably, the carbon having the highest number defining the ring should not contain pendent groups except for hydrogen atoms. The cyclohydrocarbon, in addition to the functional groups stated above, may contain hydrocarbon or functional groups pendent from other carbon atoms of the ring except for at least one carbon atom of the ring which is adjacent to the ethylenic group, as described above.

In general, cyclic olefins useful in providing the regio-regular polymer used herein is a functionalized, cycloalkene which can be represented as:

II wherein at least one carbon atom which is alpha with respect to the ethylenic group has only hydrogen atoms pendent therefrom, X represents hydrogen or a $C_1$–$C_5$ alkyl or Y; and Y represents a functional group selected from hydroxyl, carboxylic acid, carboxylic acid esters of a $C_1$–$C_5$ alkyl, acetate, amide, nitrile or carbonyl group. It is preferred that X and Y represent functional groups and that they are the same functional group. The symbol "a", is a value of 0 to 6 and "b" has a value of 0 to 6 provided the sum of a+b is a value of 0 or an integer between 2 and 7. Each R pendent from the ring carbon atoms of "a" and "b" can independently represent a hydrogen atom, a $C_1$–$C_5$ (preferably a $C_1$–$C_2$) alkyl group or a functional group, as described above.

Figure 2:
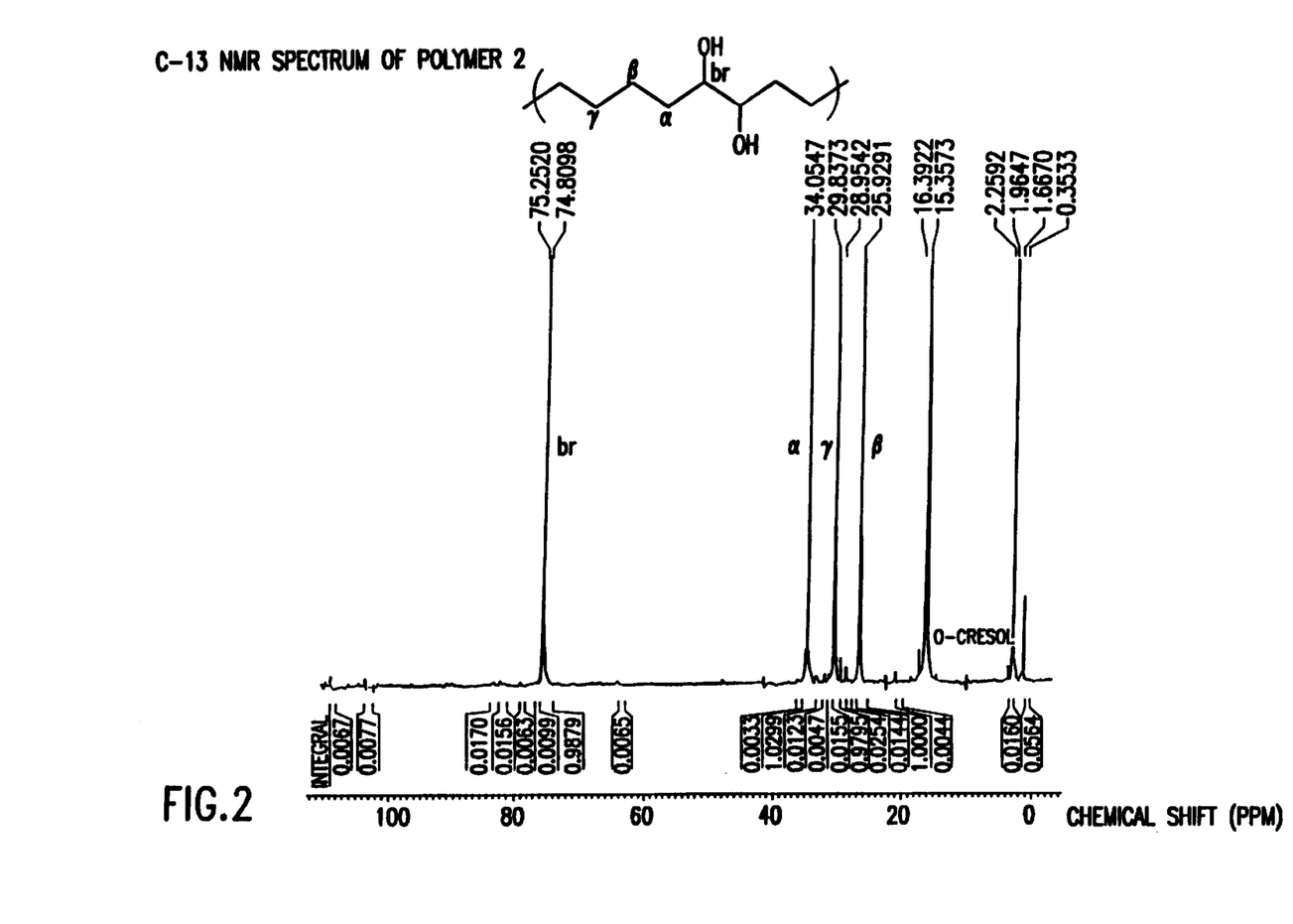
FIG. 2 is a carbon-13 nuclear magnetic resonance spectrum of a substantially linear, regio-regular, vicinal hydroxyl group functionalized polymer formed by ROMP of 1,2-dihydroxycyclooct-5-ene followed by hydrogenation, which polymer has been found useful in forming packaging materials and articles of the present invention.
Figure 3:
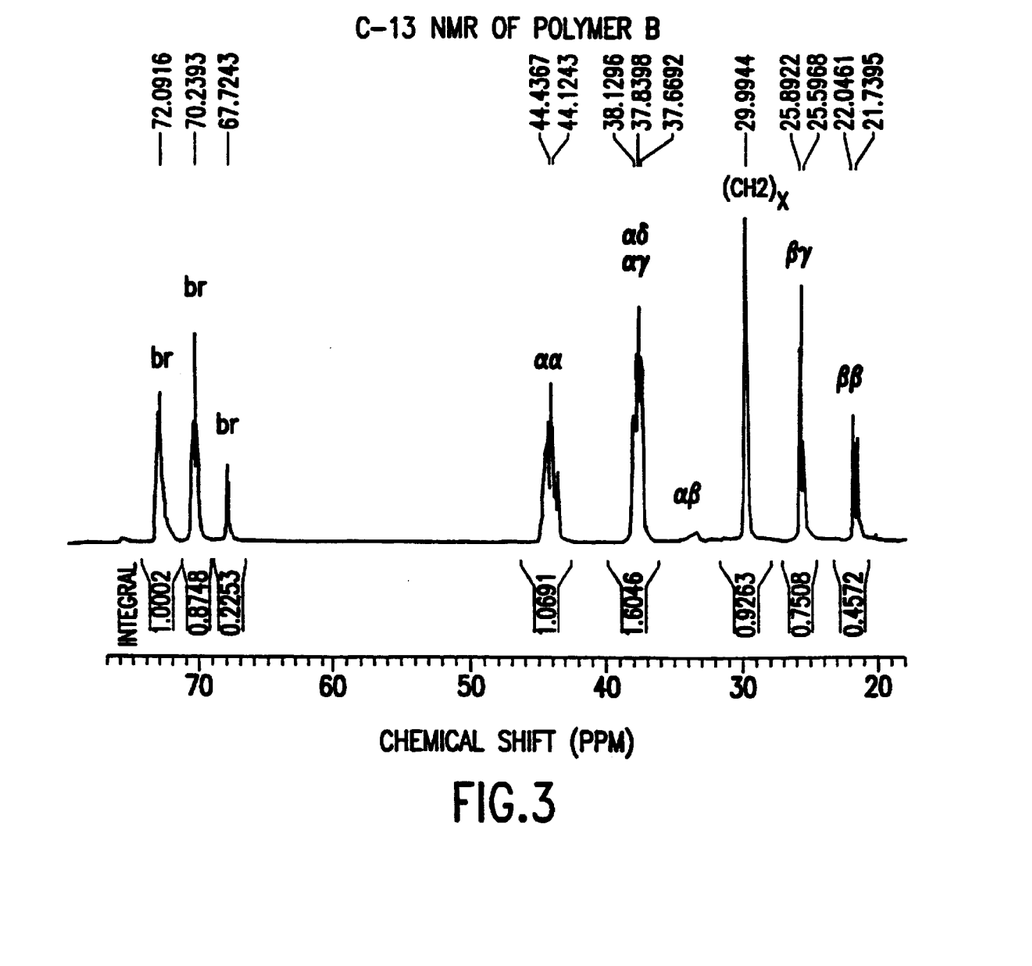
FIG. 3 is a carbon-13 nuclear magnetic resonance spectrum of commercially obtained ethylene-vinyl alcohol copolymer having 56 mole percent vinyl alcohol units (Polymer "B" above). This spectrum is for comparative purposes with respect to the spectrum of FIG. 2 of a polymer having comparable hydroxyl content.

The packaging material and Packaging Article of the subject invention shall be discussed herein below primarily in terms of utilization of hydroxylated polymers (where X or Y; or both X and Y represent an —OH group). These polymers can be viewed as copolymers of vinyl alcohol and an alkylene, such as ethylene, linear propylene and the like. For example, it has been found that ROMP of 1,2-dihydroxycyclooct-5-ene provides a polymer which, after hydrogenation, can be viewed as a copolymer of ethylene and vinyl alcohol wherein the vinyl alcohol units are arranged strictly in a head-to- head configuration. Ethylene/vinyl alcohol (EVOH) copolymers are commonly available and have been used in packaging materials and articles. However, these known polymers are formed by free radical copolymerization of ethylene and vinyl acetate followed by hydrolysis of the acetate groups to hydroxyl groups. The conventional EVOH copolymer contains each vinyl alcohol monomeric unit randomly distributed along the polymer chain, the hydroxyl groups (disregarding residual acetate groups) are generally configured head-to-tail when part of adjacent monomeric units and the polymer contains considerable short and long chain branch chains. In contrast, the preferred hydroxy-containing polymer provided by the present invention (a=2; b=1; X and Y=OH, each R=H) can be viewed as analogous to an ethylene/vinyl alcohol copolymer with the unique feature of having ethylene and vinyl alcohol pairs of monomeric units in a sequential arrangement of ethylene-vinyl alcohol/vinyl alcohol-ethylene along the polymer chain. Further, the adjacent vinyl alcohol units are only in a head-to-head configuration. FIG. 2 is an NMR spectrum of the regio-regular polymer used herein while FIG. 3 is an NMR spectrum of commercial EVOH copolymer having substantially the same OH content.

Another example is the formation of a polymer by the ROMP of 4-cycloocten-1-ol to provide a polymer which, after hydrogenation, can be viewed as a copolymer of ethylene and vinyl alcohol having 25 mole percent vinyl alcohol units. Again, EVOH copolymers having 25 mole percent vinyl alcohol are commercially available but differ from that presently used. The commercial materials have the vinyl alcohol units randomly distributed along the polymer chain and have a branched structure instead of a substantially linear, regio-regular configuration.

Alternately, hydroxy functionalized substantially regio-regular, linear polymer can be formed through the hydroborationloxidation of cis- 1,4-polybutadiene according to the procedure of Ramakrishnan, supra. It is well known that polymerization of 1,3-butadiene to cis-1,4-polybutadiene provides a linear hydrocarbon polymer having one olefinic unsaturation for each four carbon atom repeating unit of the polymer backbone chain. The olefinic units, uniformly distributed along the polymer chain, can be reacted by hydroboration/oxidation in the manner described by the Ramakrishnan references cited above to provide a single hydroxyl functional group for every four carbon atoms. Thus, the resultant polymer can be again viewed as an ethylene/vinyl alcohol copolymer wherein the vinyl alcohol units are substantially uniformly (regularly) distributed along the polymer chain and the polymer hydrocarbon backbone is substantially linear and composed of repeating regions of four carbon units. Again, such polymers are distinct from the commercial counterpart formed from ethylene and vinyl acetate, as discussed above. Similar to its higher regio-unit hydroxyl functional polymer described in copending U.S. application Ser. No. '079, the use of this linear, regio-regular polymer, poly(bydroxybutylene), has been found to provide a high degree of gas barrier properties and other desired physical properties not achievable by conventional materials of similar hydroxyl content.

Other functionalized polymers which can be used herein can be prepared in the manner fully described in the referenced copending application, U.S. application Ser. No. 091052,079, and herein below. The starting monomer compound, a functionalized $C_5$ or $C_7$–$C_{12}$ cycloalkene (wherein $C_5$ and $C_7$–$C_{12}$ refers to the number of ring carbon atoms) represented by the formula

II wherein X represents hydrogen, a $C_1$–$C_5$ alkyl or Y; and Y represent functional groups, as described above and preferably X and Y both represent the same functional group, "a" represents a numerical value of 0 to 6 and "b" represents a numerical value of 0 to 6, provided the sum of a+b is a value of 0 or an integer of from 2 to 7. Each R of the ring carbon atoms of "a" and/or of "b" may be unsubstituted (preferred) or further substituted, as described above. When X and Y are both functional groups, X and Y groups may be sterically positioned on the same side or opposite sides of the plane bisecting the ring carbon atoms except in the case of X and/or Y being a carbonyl group, in which case the group would be substantially within the plane of the ring. In other words, X and Y may be either in a cis or trans configuration with respect to each other.

The formation of the preferred difunctional cycloalkenes (II) found useful herein can be achieved by known methods. For example, 5-cyclooctene-trans-1,2-diol can be prepared by reacting the monoepoxide of 1,5-cyclooctadiene with perchloric acid in an aqueous solution at elevated temperatures as taught in French Patent 1,294,313 which teaching is incorporated herein in its entirety by reference. Other methods of preparing the vicinal dihydroxy functionalized cycloalkene include reacting the cycloalkadiene monoepoxide with acetic acid and potassium acetate to initially form the hydroxy/acetate compound followed by saponification; oxidation of cycloalkadiene with peroxide and formic acid followed by basic hydrolysis [Yates et al., Canadian Journal of Chemistry, Vol. 50, 1548 (1972)]; reacting a cycloalkadiene monoepoxide with an organic acid, such as formic or acetic acid to form the hydroxy/acetate compound followed by saponification [McIntosh, Canadian Journal of Chemistry, Vol. 50, 2152 (1972)]; or reacting a cycloalkadiene with osmium tetroxide in ether/pyridine solution at low temperatures followed by reflux with sodium sulfite in water/alcohol [Leitich, Tetrahedron Letters, No. 38, 3589 (1978)].

A vicinal dione cycloalkene can be formed from the vicinal diol according to the procedure described by Yates et al., Canadian J. of Chem., Vol. 50, 1548 (1972).

The vicinal hydroxy/ketone cycloalkene and the vicinal ketone/acetate cycloalkene are formed by oxidizing the hydroxy/acetate with chromic acid in acetone at low temperatures (e.g., 0–10° C.) to form the ketone/acetate. The ketone/acetate cycloalkene can be recovered by distillation. The ketone/acetate can be converted to the vicinal hydroxy-lketone cycloalkene by hydrolysis with sodium hydroxide in methanol at slightly elevated temperatures (e.g., 40° C.).

The monoepoxy cycloalkene, which is the precursor of several of the synthetic routes described above can be obtained by catalytic oxidation of a cycloalkadiene using a peroxide and sodium tungstate as the catalyst as described by Venturello, in J. Org. Chem., 48, 3831 (1983) and J. Org. Chem., 53, 1553 (1988). Other methods of forming the mono-epoxy cycloalkene are disclosed by Grubbs, Macromolecules, 28, 6311 (1995); Camps, J. Org. Chem. 47

5402 (1982); Imuta, i. Org. Chem. 44, 1351 (1979); Murray, Org. Syn., 74, 91 (1996); and Payne, Tetrahedron, 18, 763 (1962).

The teachings of each of the above cited references is incorporated herein in its entirety by reference.

The functionalized cycloalkene can be subjected to ring opening metathesis polymerization using a well-defined ROMP catalyst. Such catalysts found useful herein are disclosed by Schrock et al in JACS 1990, 112, 3875; and U.S. Pat. Nos. 4,681,956; 5,312,940; and 5,342,909. The preferred catalysts are those described in U.S. Pat. No. 5,312,940. The teachings of each of the above references is incorporated herein in its entirety by reference.

One class of ROMP catalyst found useful in providing the present polymers can be represented by the general formula:

$$M(NR^1)(OR^2)_2(CHR^3) \qquad \text{III(a)}$$

wherein:

M is molybdenum or tungsten;

$R^1$ and R2 of Formula 111(a) are independently selected from alkyl, aryl, aralkyl or halogen-substituted derivatives or silicon-containing analogs thereof. Examples of aryl groups are phenyl, 2,6-diisopropylphenyl and 2,4,6-trimethylphenyl. Examples of aralkyl groups are benzyl and triphenylmethyl. Examples of $R^1$ in Formula IIIa are 2,6-diisopropylphenyl, 2,4,6-trimethylphenyl, 2,6-di-t-butylphenyl, pentafluorophenyl, t-butyl, trimethylsilyl, triphenylmethyl, triphenylsilyl, tri-t-butylsilyl, and perfluoro-2-methyl-2-pentyl and the like. Examples of $R^2$ in Formula Ma are t-butyl, trifluoro-t-butyl $[(CF_3)(CH_3)_2C]$, perfluoro-t-butyl, perfluoro-2-methyl-2-pentyl, 2,6-diisopropylphenyl, pentafluorophenyl, trimethylsilyl, triphenylsilyl, tri-t-butylsilyl, and hexafluoro-t-butyl $[(CF_3)_2(CH_3)C]$ and the like. $R^3$ of Formula III(a) is selected from an alkyl, aryl, aralkyl or any substituent that results from the initial reaction between the $M=CHR^3$ complex and the olefin(s) that is(are) being metathesized, alkyl has 1–20 carbons, aryl has 6–20 carbons and aralkyl has 7–20 carbons; $R^3$ is preferably t-butyl or phenyl, but since the $M—CHR^3$ moiety of the compound of Formula Ina is intimately involved in the catalytic reaction, it is recognized that the $CHR^3$ ligand is replaced by any other alkylidene fragment from the olefins that are being metathesized.

The catalyst ma should not be used with monomer II which has a proton on the functional group, that is, for example hydroxyl, carboxylic acid and the like. It may be used where ester, acetate, carbonyl and the like groups are present.

The preferred ROMP catalysts are those represented by the general formula:

IIIb wherein:

M is selected from Mo, W, Os or Ru; and preferably Ru or Os; and most preferably Ru;

R and $R^1$ are independently selected from hydrogen; $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl or $C_1$–$C_{20}$ alkylsulfinyl; each optionally substituted with $C_1$–$C_5$ alkyl, halogen, $C_1$–$C_5$ alkoxy or with phenyl group optionally substituted with halogen, $C_1$–$C_5$ alkyl or $C_1$–$C_5$ alkoxy; preferably R and $R^1$ are independently selected from hydrogen; vinyl, $C_1$–$C_{10}$ alkyl, aryl, $C_1$–$C_{10}$ carboxylate, $C_2$–$C_{10}$ alkoxycarhonyl, $C_1$–$C_{10}$ alkoxy or aryloxy; each optionally substituted with $C_1$–$C_5$ alkyl, halogen, $C_1$–$C_5$ alkoxy or with a phenyl optionally substituted with halogen, $C_1$–$C_5$ alkyl or $C_1$–$C_5$ alkoxyl;

X and $X^1$ are independently selected from any anionic ligand;

preferably X and $X^1$ are independently selected from halogen, hydrogen; $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, aryl or $C_1$–$C_{20}$ alkylsulfonyl or $C_1$–$C_{20}$ alkylsulfinyl; each optionally substituted with $C_1$–$C_5$ alkyl, halogen, $C_1$ $C_5$ alkoxy or with a phenyl group optionally substituted with halogen, $C_1$–$C_5$ alkyl or $C_1$–$C_5$ alkoxyl;

L and $L^1$ are independently selected from any neutral electron donor, preferably L and $L^1$ are independently selected from phosphine, sulfonated phosphine, phosphite, phosphinite, phosphonite, arsine, stilbene, ether, amine, amide, sulfoxide, carbonyl, nitrosyl, pyridine or thioether; and wherein any 2, or 3 of X, $X^1$, L, $L^1$ may be optionally bonded together to form a chelating multidentate ligand.

The ROMP of a functional $C_5$ or $C_7$–$C_{12}$ cycloalkene (II) may be carried out neat or by providing a solution of (II) in a hydrocarbon solvent such as, an aromatic hydrocarbon as, for example: benzene or toluene; tetrahydrofuran; dialkyl ethers; cyclic ethers; sec-butyl alcohol, tert-butyl alcohol; and the like and halogenated solvents, such as, halogenated aromatics as well as halogenated alkanes and the like. The preferred solvents are chlorinated alkanes, such as dichloroniethane and the like, chlorinated aromatics, such as monochlorobenzene and the like. The molar ratio of (II) to catalyst III(b) should be from about 200 to 5,000, preferably from about 400 to 3000. The ROMP reaction may be carried out at temperatures of from about 10° C. to 75° C. and preferably from about 20° C. to 50° C. The most preferred temperature will depend on the particular starting material, the ROMP catalyst, and the solvent used and can be determined by minor experimentation and is usually in the range of from 35 to 50° C. The time dedicated to carrying out the ROMP reaction may range from only a few minutes to about 48 hours. The reaction time is normally from 2 to 30 hours, with 10 to 20 hours being preferred. The molecular weight of the formed polymer product can be regulated by (a) altering the monomer II to catalyst III(b) ratio, and/or by (b) introducing a suitable acyclic olefin in small amounts to act as a chain transfer agent. Such agents should be soluble in the polymerization reaction media or monomer used and may be, for example, cis-3-buten-1-ol, cis-3-hexen-1-ol and the like. When used, the chain transfer agent (CTA) should be present in molar ratio of monomer II to CTA of from about 50 to 2000 and preferably from about 200 to 1000.

ROMP of the functional cycloalkene (II) above provides a polymer having repeating units of the general formula:

IV wherein X, Y, a and b are the same as defined for Formula I above and each R independently represents hydrogen or a $C_1$–$C_5$ alkyl or a Y group. It should be noted that the ROMP process of the preferred cycloalkene (II) provides a polymer IV having vicinal functional groups X and Y, the polymer chain is substantially linear, and the chain further contains an ethylenic unsaturation spaced (a) carbon atoms from the X functional group. In the polymer, groups X and Y may have the same or opposite stereo-configuration to that of the cyclic monomer used. Similarly, the polymer product IV has double bonds which normally provide a mixture of both cis and trans geometric isomers (i.e., the alkenyl hydrogen atom may be cis or trans with respect to its nearest alkenyl hydrogen atom neighbor). Further, the above structure IV is the repeating unit of the formed polymer and, thus, does not have any substantial degree of randomness of the X and Y groups and of the alkylene units along the polymer chain.

The polymer product IV can be recovered by introducing a non-solvent into the solution to cause the polymer to precipitate out of solution. Such non-solvents include for example, alkanes (e.g., pentane, hexane, heptane, etc); ketones (e.g., acetone, methyl ethyl ketone, etc.) and the like. The particular non-solvent to be used can be readily determined by the artisan. The polymer product IV can be readily recovered by introducing the polymerization reaction mixture into an excess of a non-solvent liquid.

The preferred conditions and catalyst for performing a ROMP of 5-cyclooctene-trans- 1,2-diol are:
Catalyst: Compound 111(b) wherein $X=X^1=Cl$ $L=L^1=tricycloalkylphosphine$ (e.g., tricyclohexylphosphine) R=phenyl or 1,1-diphenylethenyl $R^1$=hydrogen
Solvent(s): chlorinated alkanes (e.g., methylene chloride)
Temperature range: 40–50° C.
Time range: 6 to 24 hours The separated polymer IV can be subjected to conventional catalytic hydrogenation or, optionally, chemical hydrogenation (e.g., using chemical hydrogenation agents, such as para-toluene sulfonyl hydrazide and the like) to provide a substantially completely saturated polymer V. The structure of polymer V repeating units can be represented by the formula:

V wherein R, X, Y, a and b are as defined for Formula IV above. Alternately, partial hydrogenation can be accomplished by controlling the hydrogenation reaction by known methods. Such methods are known to those skilled in the art and may include controlling the molar ratio of olefinic groups of the polymer to chemical hydrogenation agent, the time of hydrogenation, etc. Where catalytic hydrogenation is employed, the degree of saturation can be controlled by the time and/or hydrogen pressure used. Thus, the resultant polymer V may have residual ethylenic unsaturation to provide sites for grafting, insertion of other functional groups, or for chemical crosslinking for desired reasons. Further, polymers with residual ethylenic unsaturation can be used to form Packaging Articles, such as films, which are subsequently subjected to irradiation, such as electron-beam irradiation to cause cross-linking of the polymer contained within the layer(s) of which it is a part. The amount of residual ethylenic unsaturation will depend on the degree of grafting, insertion or cross-linking desired, the particular treatment being used and the degree of such treatment. In the case of electron beam irradiation it will depend on the radiation dosage and the position of the layer containing the subject polymer within the structure of the Packaging Article. The exact degree of unsaturation which provides the desired property can be determined by simple experimentation by the artisan.

The hydrogenation of the polymer IV can be carried out using conventional hydrogenation, such as Wilkinson's catalyst and the use of hydrogen or the use of other conventional hydrogenation catalysts, such as Raney nickel, palladium on carbon, platinum on carbonate, ruthenium alkylidene complex or the like. The polymer IV is normally dissolved in a solvent or a mixture of solvents such as those described above for the ROMP polymerization and subjected to a hydrogen pressure of at least about 300 psi, preferably from about 600 to 5000 psi. The hydrogenation is normally complete in less than 8 hours although shorter or longer times may be utilized. Normally the hydrogenation is carried out for a period of from 2 to 8 hours with from 3 to 7 hours being preferred.

When the ROMP reaction of monomer II is carried out in solution, the resulting solution containing polymer IV can be used directly to carry out the hydrogenation step. Thus, the step of separation of polymer IV from the polymerization medium can be eliminated. Further, it is believed that any ROMP catalyst which may be present in the polymer IV solution may aid in the hydrogenation reaction. In a preferred embodiment, an amount of ROMP catalyst equivalent to that used to achieve the ring-opening methathesis polymerization reaction is added, after polymerization has been completed, to catalyze the hydrogenation reaction.

An alternate manner of forming regio-regular polymers found useful in forming packaging materials and Packaging Articles of the present invention is to subject a monoepoxy Cs or $C_7-C_{12}$ cycloalkene having at least one (and preferably both) ring carbon atoms adjacent to the ethylenic unsaturation as an unsubstituted carbon, to ROMP as described herein above for the vicinal difunctional monomer II. The intermediate polymer product is isolated by precipitation with a non-solvent followed by further conversion of the epoxy groups to the desired vicinal functional groups according to the synthetic routes described above. The resultant polymer IV can be further hydrogenated to provide polymer V in the manner described above.

Another alternate route in providing regio-regular polymer V for use in the subject packaging material and articles is to first epoxidize the ethylenic unsaturation units that are substantially uniformly distributed along a linear unsaturated hydrocarbon polymer chain. Linear unsaturated hydrocarbon polymers having ethylenic units uniformly distributed within the polymer backbone chain can be formed by ROMP of a cycloalkene, such as a $C_7-C_{12}$ cycloalkene or a 1,5-yclooctadiene. The resultant polymer is linear and contains ethylenic unsaturation units which are substantially uniformly distributed along the chain. These ethylenic units can then be epoxidized by standard techniques such as catalytic oxidation using a peroxide and a tungstate catalyst. The epoxy groups can then be converted to the desired vicinal functional groups, using the synthesis methods described above, to provide polymer product V. Alternately, polymers from ROMP of unfunctionalized cycloalkenes can be subjected to hydroboration/oxidation to provide polymers useful in films of the subject invention.

In addition to forming polymers IV and V from a single monomer II, as described above, one can form copolymers by ROMP of monomer II having X and Y groups as described above and ROMP of a comonomer IIa. Comonomer II(a) can be selected from a cycloalkene represented by the formula:

IIa wherein $X^1$ and $Y^1$ have the same definition as X and Y described above for monomer II or may be selected (one or both) from hydrogen, provided $X^1$ and $Y^1$ together provide pairs which are distinct from the X and Y pairs of monomer I; $R^1$ has the same definition as R of monomer II and a and b are each independently an integer of 0–6 provided the sum of a+b is 0 or 2–7. The copolymerization by ROMP of monomers 1I and iHa to provide a linear copolymer of the subject invention can be carried out with molar ratios of II to IIa of from about 50:50 to about 100:0 with from 60:40 to 100:0 being preferred. Because the ROMP of the present monomer is substantially a living polymerization, one can introduce monomer II and monomer iHa sequentially into the polymerization reaction media to provide block(s) of units I defined above and block(s) of units I wherein X and Y are as defined immediately above for IIa. Thus a regio-regular block copolymer product is formed which is linear and preferably has vicinal functional units uniformly spaced in a head-to-head configuration at least along a portion of the polymer chain (derived from monomer II) and a second segment of the polymer chain possibly having a second set of vicinal functional units uniformly configured along a portion of the same polymer chain (derived from monomer IIa). This block copolymer may be hydrogenated, as described above for the homopolymer.

The above referenced polymers have been compared to their counterpart copolymer formed by conventional free-radical polymerization and hydrolysis and have been observed to have superior elongation properties as well as enhanced toughness, lower melting temperature and lower density. The polymers have been found useful in forming films, coatings, laminates, moldings and the like, for packaging applications. For example, regio-regular hydroxy functional polymers (both where structure I, X=H; Y=OH and R=H; and where X and Y each equal OH and R=H) formed according to the present invention have been found to have superior toughness, flexibility and elongation properties, and very low and uniform gas permeability properties not achievable with analogous conventional free radical formed copolymers having comparable hydroxyl content. Further, when the functional group Y or groups X and Y are carboxylic acid ester groups, the resulting regio-regular linear polymer provides a packaging material having good heat seal properties; when such group(s) are free carboxylic acid groups, the resultant regio-regular linear polymer provides tie (adhesion) properties to bond together distinctly different layers of a multi-ply material; when such group(s) are amide groups, the resultant polymer provides a packaging material which has good protein adhesion and good ink adhesion properties to permit printing thereon; and when such groups are carboxylic acid groups they may be treated with an alkali or alkaline earth or zinc metal base or oxide to provide ionomeric units which provide a packaging material having good anti-fogging, heat-sealability and protein adhesion properties.

As indicated above, the regio-regular polymer forms at least one layer of the packaging material and Packaging Articles of the subject invention. When the material and article are of a single layer structure, such materials and/or articles can be formed by extrusion, injection molding or extrusion/thermoforming processes. When the material and article are of a multi-layer structure, they are typically formed using co-extrusion, coating, lamination, blow molding, coextrusion/ther-moforming, extrusion/coating, or extrusion/lamination, as taught in U.S. Pat. Nos. 5,350,622 and 5,529,833.

The layers of the Packaging Article which contains the subject regio-regular polymer can be formed solely of the regio-regular polymer having the desired functionality for a specific known use. It has been unexpectedly found that material containing such layer has enhanced physical properties, such as flexibility, toughness and elongation as well as functionality (i.e., end-uses) when compared to like packaging material containing a layer of conventional polymer of like functional group content. Alternately, the layer of packaging material which contains the subject regio-regular polymer may be in the form of a composition comprising the regio-regular polymer uniformly distributed or dispersed in another polymer(s). It is preferred that the composition retain a high degree of transparency, as such property is highly desired in the packaging art and, further, indicates the compatibility of the particular regio-regular polymer and the carrier polymer used. Normally, the regio-regular polymer should be the major component of the composition, preferably being greater than 60 weight percent, and more preferably greater than 75 weight percent. The carrier polymer may be chosen from any thermoplastic polymer such as PVC, EVA, PET, PE, PP or copolymers thereof. For example, the hydroxyl functionalized regio-regular polymer V described herein and in the referenced copending application may be blended with a conventional EVOH copolymer for a particular end-use. The exact nature of the carrier polymer and the amount to be blended with the regio-regular polymer chosen for use can be readily determined by the artisan depending on end use, the desire to maintain transparency, and the degree of functionality to be exhibited by the packaging material and articles.

Figure 1:
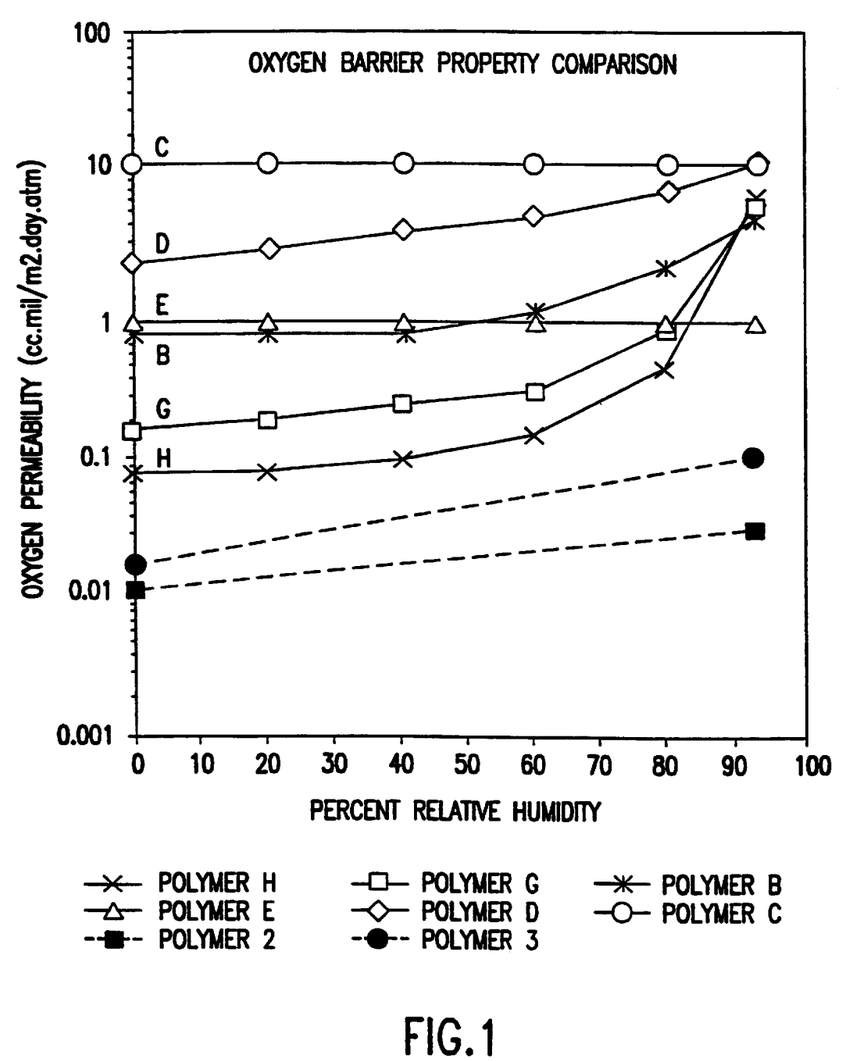
FIG. 1 is a graphical representation of oxygen permeability versus environmental moisture (relative humidity) for monolayer packaging films formed from commercially known oxygen barrier polymers and for a vicinal dihydroxy linear regio-regular hydrocarbon polymer, as taught herein. Polymers C-H are commercial polymers used here for comparative purposes. Polymer "C" is a polyacrylonitrile copolymer (Barex 210 of British Petroleum); Polymer "D" is a nylon polymer of meta-xylenediamine-co-adipic acid (MXD6 of Dupont); Polymer "E" is a polyvinylidene chloride (Saran® of Dow); Polymers "B", "F" and "G" are ethylene-vinyl alcohol copolymers having 56, 68 and 73 mole percent vinyl alcohol, respectively, (EVALCO Products E151A, F Series, and L Series). Polymers "B", "F" and "G" are each non-linear copolymers which do not have a regio-regular structure. Polymer "7" is a vicinal dihydroxy functional, linear regio-regular polymer formed by ring-opening metathesis polymerization (ROMP) of 1,2-dihydroxycyclooct-5-ene followed by hydrogenation.

With respect to the preferred functionalized, regio-regular hydrocarbon polymer wherein either X or Y is a hydroxyl group or both X and Y are vicinal hydroxyl groups, the resultant packaging material has been found to have extremely low values of gas (oxygen) permeability and to maintain said low values independent of moisture content in the surrounding environs (exterior and interior to the resultant Packaging Article). The comparative results for the subject vicinal dihydroxyl functionalized regio-regular polymer versus various commercial ethylene-vinyl alcohol copolymers (having varying vinyl alcohol content), as well as other known gas barrier polymers are illustrated in FIG. 1. The present material is shown to be nearly 100 times more effective as a gas barrier material than its commercial counterpart EVOH having about 56 mole% vinyl alcohol (Polymer B).

The layer of the packaging material containing the subject regio-regular polymer may be of any thickness. The exact thickness will depend on its particular function as part of the packaging material as well as the structure of the packaging material (film or semi-rigid or rigid article). With respect to films, the thickness can range from 0.025 to 10 mils, preferably from 0.05 to 8 mils and most preferably from 0.1 to 5 mils. Where the material is used as, or as part of, a semi-rigid or rigid article, the layer containing the functionalized regio-regular polymer defined herein may range from about 0.025 mil to 10 mils, preferably from 0.05 mil to 8 mils. The exact thickness can be determined by the artisan for the particular application.

The composition of the layer comprising the regio-regular polymer defined herein can further contain other components, such as pigments, fillers, clays, exfoliated clays (e.g., nanocomposite utility), stabilizers, processing aids, plasticizers, fire retardants, anti-fog agents, dyestuff and the like. The total quantity of said additives is generally less than 10%, usually less than 5% by weight relative to the total composition. The selection of such components depends largely on the material and article to be formed, its method of formation and its contemplated end use. Selection factors for such components are well known in the art.

The subject packaging material and Packaging Article of the present invention can be composed of a single layer or multi-layer structure wherein at least one layer comprises a functionalized, linear regio-regular hydrocarbon polymer. The polymer may further be crosslinked and/or oriented by stretching (uni or biaxially) as may be desired by those skilled in the art.

A multi-layer packaging material and Packaging Articles can be constructed with a plurality of layers, each of which is selected to perform a particular function. Where a layer is formed of a functionalized polymer, such layer may be formed of the functionalized, linear, regio-regular hydrocarbon polymer contemplated herein wherein said polymer has the appropriate functionality. Thus, for example, a multi-layer packaging material and article may contain a gas barrier layer comprising a hydroxy (preferably the vicinal dihydroxy) functionalized, regio-regular polymer and a sealant layer wherein the functionality is selected from carboxylate ester groups or simply linear low density type polyethylene. In many multi-layer structures, at least one surface layer (and optionally, both surface layers) are structural and protective layers, such as formed from olefinic thermoplastic material as, for example, polypropylene, low density polyethylene, linear low density polyethylene (LLDPE) and the like. An inner layer between the surface layers can include a gas barrier layer as, for example, composed of the vicinal dihydroxy regio-regular polymer described hereinabove and tie layers to provide interply adhesion.

Other examples of multi-layer structures useful for packaging materials and Packaging Articles include two-layer structures composed of a barrier layer (mono-hydroxy or vicinal dihydroxy regio-regular hydrocarbon polymer described above) and a heat sealable layer which may comprise a polyolefin as, for example, ethylene/butene copolymers, ethylene/hexene copolymers, ethyleneloctene copolymers, ethylene/unsaturated ester copolymer (e.g., ethylene/vinyl acetate or ethylene/alkyl acrylate copolymers) and the like. A three layer structure may comprise the above two layers further having a wear or abuse resistant layer as the surface layer adjacent to the barrier layer to provide an abuse-resistant/barrier/sealant multi-layer structure. The abuse-resistant layer may comprise a polyolefin such as polyethylene, polypropylene and the like. Another multi-layer structure may comprise a layer or more than one layer which is used to ensure or enhance interiarinar bond strength between any or all of the other layers of a packaging material or article (a tie layer). The placement of such tie layer(s) will depend on the other layers used and their inherent adhesion to each other. The tie layer may comprise a copolymer of ethylene and (meth)acrylic acid, or an anhydride-grafted polyolefin, or the like or, alternately may be composed of a conventional adhesive or glue such as a polyurethane (most appropriate where laminate construction is contemplated). The tie layer may be formed of a regio-regular hydrocarbon polymer having carboxylic acid groups pendent therefrom.

The multi-layer structure may also contain an oxygen-scavenging layer. Such layers are normally an internal layer located towards the surface layer which is proximate to the cavity of the Packaging Article. Thus, a material or package of the present invention may, for example, have a structure which comprises abuse-resistant/oxygen barrier/adhesive/oxygen scavenger/sealant multi-layer structure. The scavenger layer is normally composed of a carrier polymer which contains an agent capable of interacting with or absorbing and/or reacting with oxygen from the interior cavity of a Packaging Article.

In any of the above multi-layer structures or other structures suitable for providing a packaging material and Packaging Article, the subject functionalized, linear, regio-regular hydrocarbon polymer contemplated herein and in copending application Serial No. 09/052,079 is used to provide at least one layer formed of polymer of the proper functional groups for the intended functions within the article. It has been unexpectedly found that the present regio-regular, functionalized hydrocarbon polymer provides enhanced functionality and a Packaging Article with enhanced functional and tensile properties.

The following examples are given for illustrative purposes only and are not meant to be a limitation on the claims, appended hereto. All parts and percentages are by weight unless otherwise indicated.

EXAMPLES

The molecular weights of the polymers reported below were determined by GPC at 50° C. using a Waters Alliance System #4 gel permeation chromatograph equipped with a Waters 41 -RI detector. Phenogel 5 columns (2×linear and 1×100 Å) were used. The eluent was 1-methyl-2-pyrrolidinone/50 mM lithium bromide. Polystyrene narrow molecular weight standards were used for calibration.

The melt flow rate of the polymers is reported as MFI (Melt Flow Index) in grams per 10 minutes- The MFI was determined at 190° C. using 2.16 Kg weight according to ASTM DI 238 using a CSI MFI-2 melt flow indexer.

The oxygen transmission rate (OTR) of pressed film samples was determined using a Mocon Ox-Tran 2/20 ML module following ASTM D3985–81. The polymer powder was blended with the stabilizers and compression molded into thin films (1–6 mils thick) at 190° C. for 5 minutes. A compressive force of 15,000 pounds was applied and subsequently the sample was cooled to ambient temperature at about 15° per minute. The pressed films were dried in a vacuum oven at 80° C. and conditioned in a dessicator for at least 24 hours prior to testing.

The mechanical properties were measured using an Instron 4204 tester. Modulus, Yield Stress and Yield Strain were determined at an extension rate of 0.5 inch/min and Maximum Stress, Break Stress, Break Strain and Toughness were measured at a crosshead speed of 10 inch/min. Test samples were compression molded at 190° C. for 5 minutes followed by cooling at 15°/min using 20 mil shims. Test films were allowed to condition for at least 24 hours in a dessicator at room temperature prior to testing. The dimensions of the dumb-bell test specimens are 1 inch by 4.5 inches.

EXAMPLE 1

Synthesis of Linear 4-Cycloocten-1-ol Homopolymer and Saturated Derivative (Monomer/Catalyst Molar ratio =400)

The reaction was carried out in a 2 liter resin kettle fitted with an overhead stirrer, a thermocouple, argon addition port, and two septum ports for the addition of catalyst and solvent. 450 Grams (3.5 moles) of 1-hydroxycyclooct4-ene was charged to the resin kettle. The monomer was degassed with full vacuum for a minimum of 30 minutes. 7.25 Grams (0.0088 moles) of phenylmethylenebis(tricyclohexylphosphine) ruthenium dichloride catalyst was weighed into a clean, dry half pint bottle in a dry box and the bottle was capped with a septum before removing from the dry box. The polymer molecular weight was controlled by the monomer/ruthenium molar ratio of 750. Methylene chloride (1.5 liter) was deaerated with argon. 100 Grams of methylene chloride was added via syringe to the bottle catalyst with 1200 Grams of methylene chloride was charged via cannula into the reaction resin kettle. The mixture was stirred vigorously. Once the monomer had completely dissolved, the catalyst solution was added via syringe to the reaction resin kettle. The color changed from purple to orange after several minutes. The reaction was carried out at 40° C. for 24 hours under vigorous stirring under an argon atmosphere. As time progressed, the solution became viscous. The reaction was complete after 24 hours. The progress of the ROMP reaction was followed by NMR. The degree of conversion from monomer to polymer was determined by proton-NMR, based on integration of the vinyl protons of the monomer at 5.6 ppm and the vinyl protons of the polymer at 5.3 ppm. Ethyl vinyl ether, 70 grams (0.97 moles) was added to the reaction vessel through a fitting on the top of the kettle to terminate the ROMP reaction. After mixing the vinyl ether, the contents of the reaction kettle was poured into a 4-L beaker. 791 Grams of methanol and 0.45 grams of 2,6-di-t-butyl-4-methylphenol (BHT) were added to the beaker and mixed with a stirring bar until a homogeneous solution was obtained.

The ethylenic unsaturated polymer in the solution prepared above was hydrogenrated using tris (triphenylphosphine) rhodium chloride as the catalyst at a hydrogen pressure of 640 psi and a temperature of 60° C. for 6 hours. The molar ratio of double bonds in the unhydrogenated polymer to the catalyst was 150 to 1. The final hydrogenated polymer (designated as Polymer 1) had the following molecular weights and melt flow rate: Mn=80,300; Mw=145,800; Mz=246,000; PDI=1.8; MFI=2.3 g/10 min (with 1 wt % Irganox 1076, a commercial antioxidant available from Ciba Specialty Chemicals). The present polymer was compared to conventional ethylene/vinyl alcohol random copolymer having 25 mole percent vinyl alcohol (designated as Polymer A).

EXAMPLE 2

Synthesis of Linear 5-Cycloocten-trans-1,2-diol Homopolymer and Its Saturated Derivative 5-Cyclooctene-trans-1,2-diol (MW =142.19, 40 grams, 0.28 moles) was transferred to a three-neck, 100 ml resin kettle equipped with a mechanical stirrer, argon inlet and a septa. The monomer was degassed under vacuum for 2 hours. The system was maintained under an argon atmosphere. In an argon filled drybox, the ruthenium catalyst, phenyl-methylene bis(tricyclohexylphosphine) dichloride (0.3087 grams, 0.375 mmoles), was weighed into a septa capped glass vial and dissolved in 10 ml of methylene chloride. The deep purple catalyst solution was injected via syringe into the reaction vessel. Methylene chloride (30 ml) was purged with a vigorous stream of argon for 15 minutes and syringed into the resin kettle. The monomer/solvent solution was stirred vigorously. The reaction mixture was heated to 40° C. with an oil bath under a slow argon atmosphere for 24 hours under vigorous stirring. Subsequently, the resin kettle was removed from the oil bath and the reaction mixture was cooled to ambient temperature. Ethyl vinyl ether (0.754 grams, 1 ml, 10.5 mmoles) was added to the reaction mixture along with 40 ml of tetrahydrofuran and 40 ml of methanol and stirred until complete dissolution. The homogeneous solution was subsequently poured into a solution of 700 ml of cold acetone and 0.4 g of 2,6-di-tert-butyl-4-methylphenol (BHT) to precipitate the polymer. The polymer was redissolved in 20 ml of tetrahydrofuran and 20 ml of methanol and 0.4 grams of BHT and reprecipitated in cold acetone as previously done. This process was repeated one more time. The polymer was dried overnight in a vacuum oven at 60° C. to yield 13.4 grams of a hard solid, yellow polymer.

12 Grams of the dried ethylenically unsaturated polymer was dissolved in 60 ml of tetrahydrofuran and 60 ml of methanol and 0.5205 grams (0.5625 mmoles) of tris (triphenylphosphine) rhodium chloride [RhCl(PPh$_3$)] catalyst was added. The mixture was hydrogenated in a 600 ml Parr reactor at 600 psi /54° C. for 6 hours. The reactor was cooled to ambient temperature and the pressure was vented. The solution was filtered through a fritted funnel and the powdery polymer was rinsed with acetone. The polymer was redispersed in acetone overnight and filtered and washed with acetone one more time. The slightly yellow polymeric powder was then dried in a vacuum oven for 7 hours to yield 11.2 grams of hydrogenated polymer (designated "Polymer 2"). The resulting polymer had the following molecular weights and melt flow rate: Mn=23,900, Mw=47,000, Mz=78,900, PDI=2, MFI=>10 g/10 min with 0.1 wt % Irganox 1076 as stabilizer. This polymer was compared to conventional ethylene/vinyl alcohol random copolymer having about 56 mole percent vinyl alcohol (designated "Polymer B")

EXAMPLE 3

Synthesis of Linear 5-Cycloocten-trans-1,2-diol Homopolymer and Its Saturated Derivative 5-Cyclooctene-trans-1,2-diol (MW =142.19, 30 grams, 0.21 moles) was transferred to a three-neck, 100 ml resin kettle equipped with a mechanical stirrer, argon inlet and a septa. The monomer was degassed under vacuum for 45 minutes and kept under an argon atmosphere. In an argon filled drybox, the ruthenium catalyst, phenylmethylene bis (tricyclohexylphosphine) dichloride (MW=822.96, 0.2319 grams, 0.2818 nmnoles) was weighed into a septa-capped glass vial and dissolved in 30 ml of argon purged methylene chloride. The molar ratio of monomer to ruthenium was 750. The deep purple catalyst solution was injected via syringe into the reaction vessel. The reaction mixture was maintained at 40° C. under an argon atmosphere for 24 hours under vigorous stirring. Subsequently, the resin kettle was removed from the heat source and the reaction mixture was cooled to ambient temperature. Ethyl vinyl ether (0.528 grams, 0.7 ml, 7.3 mmoles) was added to the reaction mixture along with 40 ml of tetrahydrofuran, 40 ml of methanol and 0.15 grams of 2,6-di-tert-butyl-4-methylphenol (BHT). The mixture was stirred until a homogeneous solution was obtained. The polymer was subsequently precipitated into a solution of 700 ml of methyl ethyl ketone (MEK) and 0.15 g of BHT. The polymer was redissolved in 30 ml of tetrahydrofuran and 30 ml of methanol and 0.15 grams of BHT and reprecipitated in an MEK/BHT mixture as previously done. This process was repeated one more time. The polymer was dried overnight in a vacuum oven at 60° C. to yield 12.5 grams of a hard solid, yellow polymer.

The unhydrogenated polymer (12.5 grams) was redissolved in 36 grams of tetrahydrofuran and 36 grams of methanol and 0.0625 grams of BHT for hydrogenation. Tris(triphenylphosphine) rhodium chloride [RhCl(PPh$_3$)] (MW=925.27, 0.542 grams, 0.586 mmoles) catalyst was added to the polymer solution. The mixture was hydrogenated in a 600 ml Parr reactor at 600 psi /60° C. for 6 hours. The reactor was cooled to ambient temperature and the pressure was vented. The solution was filtered through a fritted funnel and the powdery polymer was rinsed with acetone. The polymer was redispersed in acetone overnight. The polymer was then filtered and washed with 400 ml of acetone. The slightly yellow polymeric powder was then dried in a vacuum oven overnight. 12 Grams of polymer (designated "Polymer 3") was obtained. The resulting polymer had the following molecular weights and melt flow rate: Mn=19,200, Mw=43,600, Mz=77,500, PDI=2.3, MFI=5.4 g/10 min with 1 wt % Ultranox 2714A (from GE Specialty Chemicals) as stabilizer.

EXAMPLE 4

Synthesis of Linear 5-Cycloocten-trans-1,2-diol Homopolymer and Its Saturated Derivative (Molecular weight control using cis-3-hexen-1-ol as chain transfer agent at a monomer /ruthenium molar ratio of 2500 and a monomer/chain transfer agent molar ratio of 260)

5–Cyclooctene-trans- 1,2-diol (50 grams, 0.35 moles) was transferred to a three-neck, 200 ml resin kettle equipped with a mechanical stirrer, argon inlet and a septa. The monomer was degassed under vacuum for one hour. The system was kept under an argon atmosphere. Distilled cis-3-hexen-1-ol (0.13 grams, 1.352 mmoles, 0.16 ml) was added by syringe. Methylene chloride (40 ml) was purged with a vigorous stream of argon for 15 minutes and transferred via a syringe into the resin kettle. The monomer/solvent solution was stirred vigorously. In an argon filled drybox, the ruthenium catalyst, phenylmethylene bis (tricyclohexylphosphine) dichloride (0.11 grams, 0.141 mmoles) was weighed into a septum-capped glass vial and dissolved in 10 ml of methylene chloride. The deep purple catalyst solution was injected via syringe into the reaction vessel. The reaction mixture was maintained at 40° C. under an argon atmosphere for 24 hours under vigorous stirring. Subsequently, the resin kettle was removed from the heat source and the reaction mixture was cooled to ambient temperature. Ethyl vinyl ether (2.92 grams, 3.9 ml, 40.4 mmoles) was added to the reaction mixture along with 100 ml of methanol, 100 ml THF and 0.5 grams of 2,6-di-tert-butyl-4-methylphenol. The polymer solution was directly hydrogenated without precipitation and recovery of the unhydrogenated polymer.

The hydrogenation was carried out in a 600 ml Parr reactor. 2.17 Grams (2.34 mmoles) of tris (triphenylphosphine) rhodium chloride was added to the above solution and the polymer was hydrogenated at 600 psi for 6 hours. The reactor was cooled to room temperature and vented. The resulting polymer solution was blended with 600 ml of acetone and 0.5 grams of BHT. The solution was filtered and the polymer powder was washed 3 times with 200 ml of acetone. The filtered powder was resuspended in 600 ml of acetone, 0.5 grams of BHT and 0.25 ml of 2,4-pentadione and stirred overnight. The polymer dispersion was filtered and washed with three portions of 200 ml acetone. The filtered polymer was dried in a vacuum oven at 60° C. for 5 hours. The resulting polymer (designated as Polymer 4) had the following molecular weights and melt flow rate: Mn=31,300, Mw=145,000, Mz=269,000, PDI= 4.6, MFI=1.4 g/10 min with 0.5 wt % sodium acetate and 0.5 wt % Ultranox 626 (from GE Specialty Chemicals) as stabilizers.

EXAMPLE 5

Oxygen Transmission Rate Measurements of Linear Ethylene-Vinyl Alcohol Copolymers Table I describes the copolymers that were evaluated and compared.

TABLE 1

Description of Polymers reported in Table 2

| | |
|---|---|
| Polymer A | A commercially obtained random, branched ethylene-vinyl alcohol copolymer. Comparative Sample (Polysciences Inc. Catalog No. 18100) containing 25 mole percent vinyl alcohol. |
| Polymer 1 | Linear polymer with 25 mole percent vinyl alcohol units prepared via ROMP of 4-Cycloocten-1-ol followed by hydrogenation with Wilkinson's catalyst. Prepared from molar ratio of monomer to ruthenium catalyst of 400. |
| Polymer 2 | Linear ethylene-vinyl alcohol copolymer containing 50 mole percent vinyl alcohol as vicinal diols prepared via ROMP of 5-cyclooctene-trans-1,2-diol followed by hydrogenation with Wilkinson's catalyst. Molecular weight controlled by monomer to ruthenium catalyst ratio of 750. |
| Polymer 3 | Linear ethylene-vinyl alcohol copolymer containing 50 mole percent vinyl alcohol as vicinal diols prepared via ROMP of 5-cyclooctene-trans-1,2-diol followed by hydrogenation with Wilkinson's catalyst. Molecular weight controlled by monomer to ruthenium catalyst ratio of 750. |
| Polymer 4 | Linear ethylene-vinyl alcohol copolymer containing 50 mole percent vinyl alcohol as vicinal diols prepared via ROMP of 5-cyclooctene-trans-1,2-diol followed by hydrogenation. Molecular weight controlled by use of cis-3-hexen-1-ol as chain transfer agent. Molar ratio of monomer to ruthenium catalyst was 2500 and molar ratio of monomer to chain transfer agent was 260. |
| Polymer B | A commercially obtained branched, random, commercial ethylene-vinyl alcohol copolymer containing 56 mole percent vinyl alcohol (Evalca E151A). Comparative Example. |

TABLE 2

Comparison of Oxygen Gas Permeability

| Sample | Description | Thickness (mils) | Oxygen Permeability (cc · mil/m² · day · atm) | |
|---|---|---|---|---|
| | | | Dry Condition 0% Relative Humidity | Humid Condition (% RH) |
| Polymer A (Comp.) | EVOH (25 mole % VOH) Random, branched Regio-regular | 6 | 1032 | 1122 (94% RH) |
| Polymer 1 | Linear EVOH (25 mole % VOH) | 4.2 | 1 | 46.3 (100% RH) |
| Polymer 2 | Linear Regio-regular EVOH-(50 mole %) | 1.8 | 0.011 | 0.03 (93% RH) |
| Polymer 3 | Linear Regio-regular EVOH (50 mole %) | 4.8 | 0.017 | 0.1 (96% RH) |
| Polymer 4 | Linear Regio-regular EVOH (50 mole %) | 6.1 | 0.029 | — |
| Polymer B (Comp.) | EVOH (56 mole %) Random, branched | 6.3 | 0.96 | 2.7 (85% RH) |

It can be seen from Table 2 that with either 25 or 50 mole percent vinyl alcohol content, the linear regio-regular hydroxyl functionalized copolymers exhibit much better oxygen gas barrier property both under dry and humid conditions than random, branched copolymers having substantially the same vinyl alcohol molar content.

TABLE 3

Comparison of Mechanical properties of EVOH Copolymers

| Mole Percent Vinyl alcohol: Chemical architecture: | | Polymer A 25 random, branched | Polymer 1 25 regio-regular linear | Polymer B 56 random, branched | Polymer 3 50 regio-regular linear |
|---|---|---|---|---|---|
| Modulus | ksi (sd)(*) | 113 (3) | 188 (11) | 337 (8.7) | 180 (1.1) |
| Yield Stress | psi (sd) | 2,395 (82) | 5,161 (182) | 7737 (66) | 4663 (159) |
| Yield Strain | % (sd) | 6.7 (0.7) | 4.3 (0.2) | 4.3 (0.2) | 5 (0.3) |
| Maximum Stress | psi (sd) | 3,045 (110) | 8,632 (835) | 9093 (851) | 6578 (1160) |
| Break Stress | psi (sd) | 2,402 (151) | 8,580 (765) | 7686 (1322) | 6520 (1199) |
| Break Strain | % (sd) | 84 (26) | 342 (11) | 11.8 (8.8) | 221 (34) |
| Toughness | in.lb/in³ (sd) | 2,199 (626) | 16,843 (1,368) | 888 (743) | 9226 (2089) |

(*) sd: standard deviation

The linear regio-regular hydroxy functionalized polymers with 25 or 50 mole percent vinyl alcohol show significantly higher strain at break and toughness than their branched counterparts. The improved toughness and elongation can provide enhanced orientability and thermoformability of the resultant film. Commercial branched, random EVOH copolymers do not provide these properties.

EXAMPLE 6

Synthesis of Ethylene-Vinyl Acetate Diblock Copolymer

A 200 mL resin kettle was equipped with a mechanical stirrer, an inlet fitting for argon or vacuum application, thermocouple and a septum. The assembled reactor was evacuated and back-filled with argon prior to introduction of reagents and reactants. Distilled 1,5-cyclooctadiene (30 grams, MW=110.2, 0.27 mole) was transferred to the resin kettle via syringe. Methylene chloride (40 mL) which had been sparged with argon was syringed into the resin kettle. The mixture was stirred until homogeneous. In a drybox, ruthenium phenylmethylene bis-(tricyclohexylphosphine) dichloride (MW=822.96, 0.249 grams, 0.3025 mole) catalyst was weighed into a septa-capped glass vial and dissolved in 10 mL of argon-sparged methylene chloride. The resulting deep purple solution of catalyst was injected via syringe into the reaction vessel. The reaction mixture was maintained with vigorous stirring under an argon atmosphere and heated to 34° C. with an oil bath. After about 40 minutes, the reaction mixture became viscous. Additional methylene chloride (200 mL) was introduced into the reaction vessel to reduce the viscosity of the mixture. After one hour, 5-acetoxycyclooct-1-ene (6.5 grams, 0.038 mole, MW=168.2) was injected via syringe into the vessel and the reaction was allowed to proceed for an additional 24 hours. Toluene (200 mL) was added to dissolve tbe polymer and lower the solution viscosity. Methylene chloride was then removed on a rotary evaporator and the toluenelcopolymer solution was transferred to a glass-lined Parr reactor for hydrogenation. An additional 70 mnL was added, followed by grams (mole) of Wilkinson's catalyst. The reactor was pressurized to 600 psig hydrogen and heated to 60° C. The hydrogenation reaction was carried out for 6 hours under those conditions. The resultant hydrogenated copolymer was precipitated and washed with acetone. The diblock copolymer was dried in a vacuum oven overnight at 60° C. and gave a white powder with the following properties: $M_n$=59,400, Mw=107,000, Mz=175,000, PDI=1.8, MFI=0.7 grams/10 min. The ethylene-vinyl acetate diblock copolymer was found by $^1$H NMR to contain 12.5 weight percent vinyl acetate. The copolymer had a glass transition temperature of 34° C. and melting point of 108° C. The block copolymer was pressed into a 6 mil clear and transparent film which exhibited a seal strength of 6.9 (±1.3) lbs/in$^2$ at 120° C.

EXAMPLE 7

Synthesis of Linear Ethylene-Vinyl Alcohol Copolymer via Hydroboration/Oxidation Distilled 1,5-cyclooctadiene (88.2 grams, 100 ml, 0.815 moles) was transferred to a 1 - liter round bottom flask that was evacuated and back-filled with argon. Methylene chloride (600 mL) which had been sparged with argon was added into the reaction flask. Ruthenium catalyst phenylmethylene bis-(tricyclohexylphosphine) dichloride (0.713 grams, 0.86 mmoles) was added, followed by vigorous stirring under an argon atmosphere. The reaction was allowed to proceed for 4 hours. Ethyl vinyl ether (0.25 grams, 3.4 mmoles) was then added to stop the reaction. The polymer was isolated by precipitation in methanol and dried to yield 70.7 grams of 1,4-polybutadien. This polymer (59.4 grams) was placed in a 4-liter resin kettle and the system was purged with argon. 9-Borabicyclo[3.3. I]nonane (9-BBN, 0.5 M solution in tetrahydrofuran, 2.75 liters) was added dropwise to the kettle and the reaction mixture was stirred at 55° C. for 24 hours. The solution was then chilled to about 4° C. with an ice bath. Degassed 6M sodium hydroxide solution (298 mL) was added dropwise to the reaction mixture. Subsequently, 609 mL of a 30 percent hydrogen peroxide solution was added very slowly to the reaction. After the addition of hydrogen peroxide was completed, the mixture was heated to 55° C. for another 24 hours. The reaction mixture was cooled to ambient temperature, whereupon it separated into two layers. The THF-organic layer was separated and reduced to a volume of about 1 liter using a rotary evaporator. Methanol (500 ml) was added to dissolve the polymer. The polymer solution was precipitated into 4 liters of water and was washed again 3 times with water. The viscous solid mass was then suspended in acetone and blended to break up the polymer into smaller pieces for easy work up. The polymer was recovered and redissolved in a 50/50 mixture of THFl-methanol and reprecipitated in water. The solid mass was blended and stirred in acetone overnight. The polymer was filtered, washed with water and dried in a vacuum oven overnight. A white solid mass, 30 grams, (designated as Polymer 5) was obtained. Polymer 5 had the following properties: Mn=45,600, Mw =132,000, PDI =3, MFI =2 grams/10 min. The copolymer had a glass transition temperature of 45° C. and melting point of 108° C. The block copolymer was pressed into clear and transparent films. The films exhibited oxygen permeability of 1 and 15 cc.mil/m$^2$ day.atm at 0 and 99% relative humidity, respectively.

What is claimed is:

1. A packaging material comprising at least one layer wherein at least one of said layer comprises a linear, regio-regular functionalized hydrocarbon polymer having repeating units represented by the formula:

wherein

X and Y each independently represents hydrogen, a $C_1$–$C_3$ alkyl or a functional group selected from hydroxyl, carboxylic acid, carboxylic acid ester, acetate, amide, nitrile or carbonyl group, provided at least one of said X and Y represents a functional group;

each R independently represents hydrogen or a $C_1$–$C_5$ alkyl; and

"a" represents an integer of from 1 to 9.

2. The packaging material of claim 1 wherein each R represents hydrogen.

3. The packaging material of claim 1 wherein "a" represents an integer of 1, 2 or 4 to 9.

4. The packaging material of claim 2 wherein "a" represents an integer of 1,2 or 4 to 9.

5. The packaging material of claim 1 wherein "a" represents an integer of 1,2,5,7 or 9.

6. The packaging material of claim 1 wherein X and Y are each independently selected from hydrogen atom, hydroxyl group, carboxylic acid group, carboxylic acid ester of a $C_1$–$C_5$ alkyl, acetate group, amide group, nitrile group, or carbonyl group.

7. The packaging material of claim 2 wherein X and Y are each independently selected from hydrogen atom, hydroxyl group, carboxylic acid group, carboxylic acid ester of a $C_1$–$C_5$ alkyl, acetate group, amide group, nitrile group, or carbonyl group.

8. The packaging material of claim 3 wherein X and Y are each independently selected from hydrogen atom, hydroxyl group, carboxylic acid group, carboxylic acid ester of a $C_1$–$C_5$ alkyl, acetate group, amide group, nitrile group, or carbonyl group.

9. The packaging material of claim 4 wherein X and Y are each independently selected from hydrogen atom, hydroxyl group, carboxylic acid group, carboxylic acid ester of a $C_1$–$C_5$ alkyl, acetate group, amide group, nitrile group, or carbonyl group.

10. The packaging material of claim 6 wherein X and Y are each independently selected from hydrogen atom or hydroxyl group, provided within each of said polymer repeating units, one of each X and Y is a hydrogen atom and one is a hydroxyl group.

11. The packaging material of claim 7 wherein X and Y are each independently selected from hydrogen atom or hydroxyl group, provided within each of said polymer repeating units, one of each X and Y is a hydrogen atom and one is a hydroxyl group.

12. The packaging material of claim 8 wherein X and Y are each independently selected from hydrogen atom or hydroxyl group, provided within each of said polymer repeating units, one of each X and Y is a hydrogen atom and one is a hydroxyl group.

13. The packaging material of claim 9 wherein X and Y are each independently selected from hydrogen atom or hydroxyl group, provided within each of said polymer repeating units, one of each X and Y is a hydrogen atom and one is a hydroxyl group.

14. The packaging material of claim 6 wherein X and Y each represent a functional group selected from hydroxyl group, carboxylic acid group, carboxylic acid ester of a $C_1$–$C_5$ alkyl, acetate group, amide group, nitrile group or carbonyl group.

15. The packaging material of claim 7 wherein X and Y each represent a functional group selected from hydroxyl group, carboxylic acid group, carboxylic acid ester of a $C_1$–$C_5$ alkyl, acetate group, amide group, nitrile group or carbonyl group.

16. The packaging material of claim 8 wherein X and Y each represent a functional group selected from hydroxyl group, carboxylic acid group, carboxylic acid ester of a $C_1$–$C_5$ alkyl, acetate group, amide group, nitrile group or carbonyl group.

17. The packaging material of claim 9 wherein X and Y each represent a functional group selected from hydroxyl group, carboxylic acid group, carboxylic acid ester of a $C_1$–$C_5$ alkyl, acetate group, amide group, nitrile group or carbonyl group.

18. The packaging material of claim 6 wherein said material comprises a multi-layer material.

19. The packaging material of claim 7 wherein said material comprises a multi-layer material.

20. The packaging material of claim 8 wherein said material comprises a multi-layer material.

21. The packaging material of claim 9 wherein said material comprises a multi-layer material.

22. The packaging material of claim 10 wherein said material comprises a multi-layer material.

23. The packaging material of claim 11 wherein said material comprises a multi-layer material.

24. The packaging material of claim 12 wherein said material comprises a multi-layer material.

25. The packaging material of claim 13 wherein said material comprises a multi-layer material.

26. The packaging material of claim 15 wherein said material comprises a multi-layer material.

27. The packaging material of claim 18, 19, 20, 21, 22, 23, 24, 25 or 26 wherein said material is a film having a thickness of from about 0.025 mil to about 10 mils.

28. A packaging article having a structure comprising the packaging material of claim 1, 2, 3, 4, 5, 6, 7, 8, 9, 10, 11, 12, 13, 14, 15, 16, 17, 18, 19, 20, 21, 22, 23, 24, 25 or 26.

29. A packaging article capable of retaining an oxygen sensitive material therein, said article having a structure comprising at least one layer wherein at least one of said layers comprises a linear, regio-regular functionalized hydrocarbon polymer comprising repeating units represented by the formula:

wherein each X and Y independently represents a hydrogen atom or a hydroxyl group provided at least one of said X and Y represents a hydroxyl group; R represents hydrogen or a $C_1$–$C_5$ alkyl; and "a" represents an integer of 1–9.

30. The packaging article of claim 29 wherein both X and Y represent hydroxyl groups.

31. The packaging article of claim 30 wherein "a" represents an integer of 1, 2, 5, 7 or 9; and each R represents hydrogen.

32. The packaging article of claim 31 wherein "a" represents 1 or 5.

33. The packaging article of claim 29, 30, 31 or 32 wherein said article structure is a film.

34. The packaging article of claim 33 wherein said film is a multi-layer film.

* * * * *